United States Patent
Yamada

(10) Patent No.: US 8,113,414 B2
(45) Date of Patent: Feb. 14, 2012

(54) METHOD OF BRAZING AN ALUMINUM ALLOY MATERIAL AND METHOD OF PRODUCING AN ALUMINUM ALLOY HEAT EXCHANGER

(75) Inventor: Noriyuki Yamada, Tokyo (JP)

(73) Assignee: Furukawa-Sky Alumnum Corp., Tokyo (JP)

( * ) Notice: Subject to any disclaimer, the term of this patent is extended or adjusted under 35 U.S.C. 154(b) by 18 days.

(21) Appl. No.: 11/725,548

(22) Filed: Mar. 20, 2007

(65) Prior Publication Data

US 2007/0215674 A1    Sep. 20, 2007

Related U.S. Application Data

(63) Continuation of application No. PCT/JP2005/017656, filed on Sep. 20, 2005.

(30) Foreign Application Priority Data

Sep. 22, 2004  (JP) .................................. 2004-275744

(51) Int. Cl.
  *B23K 1/20*  (2006.01)
(52) U.S. Cl. ......................... 228/183; 228/207; 228/223
(58) Field of Classification Search .................. 228/178, 228/182, 183, 214, 223, 224, 245
  See application file for complete search history.

(56) References Cited

U.S. PATENT DOCUMENTS

| 4,579,605 A | * | 4/1986 | Kawase et al. .................. 148/26 |
| 4,781,320 A | * | 11/1988 | Fujiyoshi ...................... 228/183 |
| 5,464,146 A | * | 11/1995 | Zaluzec et al. ................ 228/208 |

FOREIGN PATENT DOCUMENTS

| JP | 3-94971 A | 4/1991 |
| JP | 3-226396 A | 10/1991 |
| JP | 5-185286 A | 7/1993 |
| JP | 6-63734 A | 3/1994 |
| JP | 7-9123 A | 1/1995 |
| WO | 98/45082 A1 | 10/1998 |

OTHER PUBLICATIONS

Nocolok Flux Material Safety Data Sheet. Provided by A-GAS. Prepared Aug. 15, 2002. Printed Jan. 31, 2002. 9 pages.*
Nocolok Flux Brochure: The Nocolok Flux Brazing Process. Provided by A-GAS. Publication date unavailable. 18 pages.*
European Search Report dated Aug. 1, 2008, issued in corresponding European Patent Application No. 05787631.0.
International Search Report of PCT/JP2005/017656 mailed on Dec. 27, 2005.
Canadian Office Action dated Apr. 1, 2011, issued in corresponding Canadian Patent Application No. 2,581,217.
Solvay-Fluor, Nocolok. Flux Brazing Technology Manual, p. 1-100, Mar. 1997. Canadian Office Action dated Apr. 1, 2011.

* cited by examiner

*Primary Examiner* — David Sample
*Assistant Examiner* — Megha Mehta
(74) *Attorney, Agent, or Firm* — Westerman, Hattori, Daniels & Adrian, LLP

(57) ABSTRACT

A method of brazing an aluminum alloy material, which is a Nocolok brazing method of the aluminum alloy material, in which the method satisfies the condition:

$$Ts \leq Tf \leq Ts+15° \text{ C.}$$

in which Tf represents an incipient fluidization temperature of a filler material, and Ts represents an incipient fluidization temperature of flux.

8 Claims, 1 Drawing Sheet

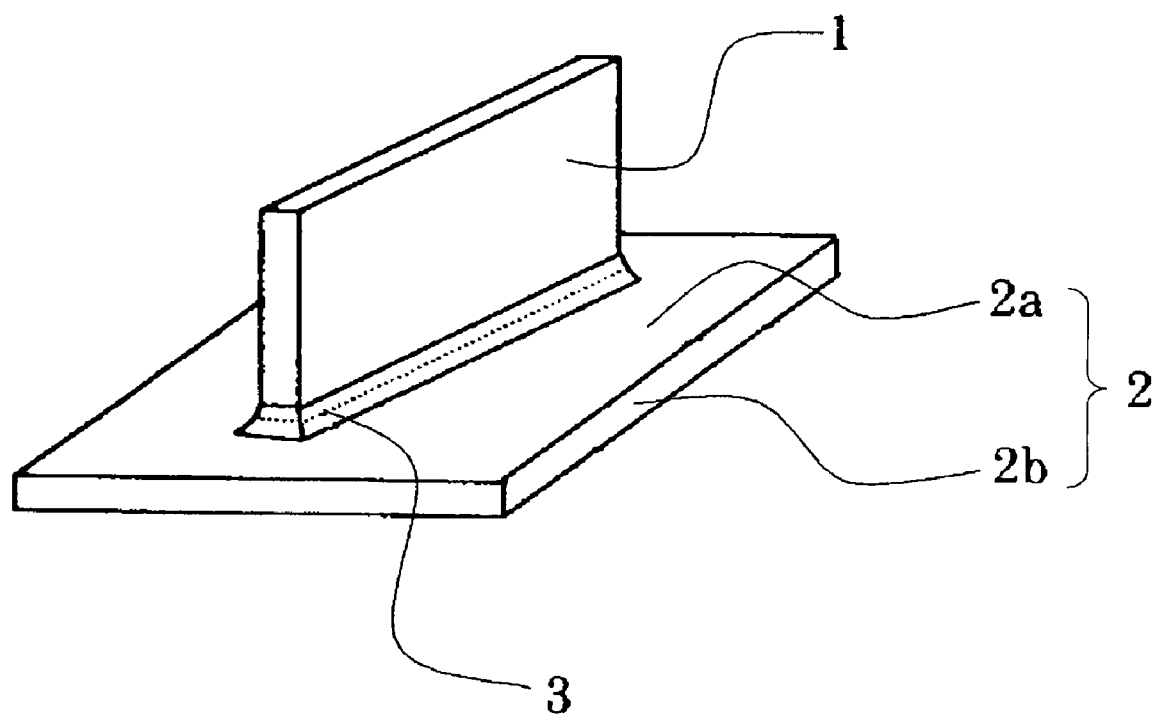

METHOD OF BRAZING AN ALUMINUM ALLOY MATERIAL AND METHOD OF PRODUCING AN ALUMINUM ALLOY HEAT EXCHANGER

This application is a continuation of international application PCT/JP/2005/017656, filed on Sep. 20, 2005.

TECHNICAL FIELD

The present invention relates to a method of welding an aluminum alloy material, and in particular, to a brazing method for an aluminum alloy material containing magnesium. Further, the present invention relates to a method of producing an aluminum alloy heat exchanger, which method comprises the step of: brazing through the above-mentioned brazing method.

BACKGROUND ART

An aluminum product such as an automobile heat exchanger is welded through a brazing method by using fluoride-based flux, in an inert gas atmosphere. The brazing method is referred to as a Nocolok brazing method (a brazing method for an aluminum alloy using potassium fluoroaluminate flux), which is conducted by using: a brazing sheet obtained by cladding a filler material, such as an Al—Si-based JIS alloy 4045 (Al-10 mass % Si) or an Al—Si-based JIS alloy 4343 (Al-7.5 mass % Si), on one side or both sides of a core material of aluminum or an aluminum alloy, at a cladding ratio of 5 to 15%; or a brazing wire of the above-mentioned alloy. Then, the brazing sheet is formed or the brazing wire is provided at a site to be welded, to thereby assemble a product. Then, fluoride-based flux containing, as a main component, $KAlF_4$, $K_2AlF_5$, $K_2AlF_5 \cdot H_2O$, $K_3AlF_6$, or the like, is suspended in water or another solution in about 5 mass %, and the suspension is applied to an aluminum member. Then, the resultant is heated in a brazing furnace (at an oxygen concentration of 1,000 ppm or less and a dew point of −35° C. or lower) to a predetermined temperature in an atmosphere of an inert gas such as a nitrogen gas.

By containing magnesium, the resultant aluminum alloy has enhanced strength, to thereby realize a product of lighter in weight and thinner in thickness thereof. However, in a conventional Nocolok brazing method (a brazing method for an aluminum alloy using potassium fluoroaluminate flux), fluorine in flux and magnesium in an aluminum alloy react with each other, to form a high melting point compound such as magnesium fluoride (MgF2) on an aluminum surface. It is assumed that the reaction causes reduction to an effect of removing an oxide layer given by the flux, inhibits wetting and spreading of a filler material, and thereby degrades brazing property. Examples of a Nocolok brazing method for an aluminum alloy material containing magnesium include: a method, providing a magnesium diffusion barrier layer at an interface between a filler material of a brazing sheet and a core material containing magnesium, to suppress a reaction between flux and magnesium (see JP-A-6-63734, ("JP-A" means unexamined published Japanese patent application) for example); and a method, incorporating cesium (Cs) into flux, to suppress formation of a high melting point compound such as magnesium fluoride (see JP-A-3-226396, for example). In the method involving providing a magnesium diffusion barrier, a barrier layer must have a thickness larger than a diffusion distance of magnesium in heat brazing, and then the brazing sheet itself cannot have a reduced thickness. Further, the flux containing cesium is very expensive, and thus the method involving incorporating cesium into flux has a disadvantage of insufficient mass productivity.

DISCLOSURE OF INVENTION

According to the present invention, there is provided the following means:

(1) A method of brazing an aluminum alloy material, which is a NOCOLOK brazing method (a brazing method for an aluminum alloy using potassium fluoroaluminate flux), wherein the method satisfies the condition:

$$Ts \leq Tf \leq Ts+15° C.$$

wherein Tf represents an incipient fluidization temperature of a filler material, and Ts represents an incipient fluidization temperature of flux.

(2) The method of brazing an aluminum alloy material according to the above item (1), wherein the aluminum alloy contains 0.05 mass % or more and 2 mass % or less of magnesium.

(3) The method of brazing an aluminum alloy material according to the above item (1) or (2), wherein the filler material starts to fluidize within 60 seconds after starting fluidization of the flux.

(4) The method of brazing an aluminum alloy material according to any one of the above items (1) to (3), wherein the filler material has a difference between solidus temperature and liquidus temperature of 30° C. or less.

(5) The method of brazing an aluminum alloy material according to any one of the above items (1) to (4), wherein the flux has a difference between solidus temperature and liquidus temperature of 30° C. or less.

(6) A method of producing an aluminum alloy heat exchanger, comprising: brazing through the brazing method according to any one of the above items (1) to (5).

As described above, the method of the present invention of brazing a magnesium-containing aluminum alloy material involves using a filler material having an incipient fluidization temperature equal to or higher than an incipient fluidization temperature of fluoride-based flux, and equal to or lower than the temperature which is higher by 15° C. than the incipient fluidization temperature of the flux, to thereby enable brazing of a magnesium-containing aluminum alloy material by using the fluoride-based flux. Further, the method of the present invention of brazing a magnesium-containing aluminum alloy material allows favorable brazing at low cost.

Other and further features and advantages of the invention will appear more fully from the following description, appropriately referring to the accompanying drawing.

BRIEF DESCRIPTION OF DRAWING

FIG. 1 is a perspective view showing assembly state of a test material for a brazing test.

BEST MODE FOR CARRYING OUT THE INVENTION

The present invention is explained in detail below.

The inventor of the present invention has conducted intensive studies, and confirmed that fluorine in the flux and magnesium in the aluminum alloy react with each other not immediately after melting of the flux, but the reaction begins suddenly at a temperature of about 15° C. higher than a temperature for melting and starting fluidization of the flux or about 60 seconds after starting fluidization of the flux. Therefore, the inventor of the present invention found that excellent brazing property can be obtained, by fluidizing a filler material before an effect of removing an oxide layer is lost due to the reaction between fluorine in the flux and magnesium.

The followings are explanations, in the brazing method of the present invention, on the reasons for limiting the magnesium content, the incipient fluidization temperature Ts of the flux, the incipient fluidization temperature Tf of the filler material, the time period required after starting fluidization of the flux to starting fluidization of the filler material, and the difference between the solidus temperature and liquidus temperature of the flux and the filler material.

In the brazing method of the present invention, most important requirements for brazing property are the incipient fluidization temperatures of the flux and the filler material. The term "incipient fluidization temperature of the flux or the filler material" is defined as a temperature at which the flux or the filler material melts in the course of heat brazing and begins wetting and spreading. Many of fluxes and filler materials have different solidus temperature and liquidus temperature, are converted into a solid-liquid mixture state under heating, and then start to fluidize when a liquid phase ratio reach about 70%. Thus, the incipient fluidization temperature is between the solidus temperature and the liquidus temperature, and can be defined as a temperature higher than the solidus temperature by about 70 when the difference between the solidus temperature and the liquidus temperature is assumed to be 100. Alternatively, the incipient fluidization temperature may be defined as a temperature at which the flux or the filler material actually begins wetting and spreading through in-situ observation with a high temperature microscope.

Tf is preferably equal to or higher than Ts. That is because in a case where the filler material fluidizes before the fluidization of the flux, the filler material covers an aluminum surface before the flux spreads on the aluminum surface to remove an oxide layer.

Further, Tf is preferably equal to or lower than the temperature higher than Ts by 15° C. This is because the flux and magnesium react with each other suddenly at the temperature higher than Ts by 15° C. or around, to thereby form a compound such as magnesium fluoride and degrade wetting and spreading of the filler material. Tf is particularly preferably a temperature equal to or lower than the temperature higher than Ts by 10° C. (Ts≦Tf≦Ts+10° C.).

The magnesium content in the aluminum alloy is preferably 0.05 mass % or more and 2 mass % or less. When a magnesium content is too small, the reaction of magnesium with the flux is not sufficiently occurred and brazing is possible by a conventional brazing technique. When a magnesium content is too large, magnesium rapidly reacts with fluorine in the flux in heat brazing, to thereby form a high melting point compound such as magnesium fluoride and degrade brazing property. A magnesium content is particularly preferably 0.1 mass % or more and 1.5 mass % or less.

The filler material preferably starts to fluidize within 60 seconds after the start of fluidization of the flux. This is because, in a case where brazing is performed under normal heating conditions, the flux and magnesium react with each other suddenly from about 60 seconds after the start of fluidization of the flux, to thereby form a compound such as magnesium fluoride and degrade wetting and spreading of the filler material. The filler material particularly preferably starts to fluidize within 40 seconds after starting fluidization of the flux. Meanwhile, the filler material and the flux may be started to fluidize at the same time, but the filler material preferably starts to fluidize 5 seconds or more after the start of fluidization of the flux.

The difference between the solidus temperature and liquidus temperature of the filler material is preferably 30° C. or less. This is because, after melting of the filler material, there is some time needed till the start of fluidization thereof. During this time, the flux and magnesium react with each other, to thereby form a compound such as magnesium fluoride and degrade wetting and spreading of the filler material. The temperature difference therebetween is particularly preferably 20° C. or less. The filler material may be a material which melts at a lower temperature, in addition to a conventional binary Al—Si filler material. Use of such a filler material allows lowering of temperature to be reached in heat brazing. As described in JP-A-6-55293, lowering of brazing temperature provides effects including: for example, improvement in heat conductivity of a fin material or in high temperature buckling property, for a heat exchanger; and suppression of erosion, improvement in corrosion resistance due to reduction in element diffusion, or extension of life of a brazing furnace, for a brazing sheet. Meanwhile, the solidus temperature and liquidus temperature of the filler material need not have a difference, but preferably has a difference of 10° C. or more.

The difference between the solidus temperature and liquidus temperature of the flux is preferably 30° C. or less. This is because, the time needed after melting till start of fluidization of the flux would be somewhat long, and during this time period, the flux undergoes reaction with magnesium at a part where the flux is adhered, to thereby degrade brazing property at the part. The temperature difference therebetween is particularly preferably 15° C. or less. Meanwhile, the solidus temperature and liquidus temperature of the flux need not have a difference, but preferably has a difference of 5° C. or more.

The flux contains as a main component at least one component selected from $KAlF_4$, $K_2AlF_5$, $K_2AlF_5.H_2O$, and $K3AlF_6$, but the flux may be other flux such as CsAlF-based or $KZnF_3$-based. The flux is preferably a mixture of $KAlF_4$ and $K_2AlF_5.H_2O$, or a mixture of $KAlF_4$ and $K_3AlF_6$. Herein, the term "a main component in a flux" means that a content of the component in the flux is 50 mass % or more, preferably 70 mass % or more.

The incipient fluidization temperature, solidus temperature, and liquidus temperature of the flux may be adjusted by varying a mixing ratio of the flux components, for example, the ratio of $KAlF_4$ to $K_2AlF_5.H_2O$, in the flux. For example, a large mixing amount of $KAlF_4$ provides a high incipient fluidization temperature of the flux, and also increases the difference between the solidus temperature and liquidus temperature of the flux.

Other element(s) may be further added thereto for adjusting the incipient fluidization temperature, solidus temperature, and liquidus temperature.

Further, an Al—Si-based filler material is used as a filler material, but any of other filler materials may also be used. Component(s) such as zinc and/or copper may be added to the filler material for adjusting the incipient fluidization temperature, solidus temperature, and liquidus temperature.

The incipient fluidization temperature, solidus temperature, and liquidus temperature of the filler material may be arbitrarily adjusted by varying a content(s) of silicon, zinc, and copper in the filler material. A preferable composition of the filler material includes 7 to 12 mass % silicon, 0.5 to 6 mass % zinc, and 0.5 to 8 mass % copper, with respect to the total mass of the filler material as 100 mass %.

Other element(s) may be further added to thereto for adjusting the incipient fluidization temperature, solidus temperature, and liquidus temperature.

A brazed product obtained by applying the present invention may have any structure as long as it is one brazed with an aluminum alloy material. Examples of the brazed product include: a brazed product obtained by brazing a bare material of a magnesium-containing aluminum alloy by using a filler material of a brazing sheet or by preplaced brazing, such as a fin material or connector material of a heat exchanger; and a brazed product obtained by brazing with a brazing sheet having magnesium added to a core material thereof.

The present invention will be described in more detail based on examples given below, but the invention is not meant to be limited by these.

EXAMPLES

Alloys for filler alloys and core alloys having respective compositions shown in Tables 1 and 2 were each cast into a metal mold. Each of the core alloys was machine finished into a thickness of 45 mm by chamfering, and each of the filler alloys was finished into a thickness of 5 mm through hot rolling after chamfering.

The filler alloy was placed on one side of the core alloy, and the whole was subjected to hot rolling at 500° C. into a clad material with a thickness of 3 mm. Then, the resulting clad material was subjected to cold rolling into a thickness of 1 mm. The resultant was subjected to annealing at 360° C. for 2 hours, to thereby prepare a brazing sheet. A cladding ratio of the filler material in the brazing sheet was 10%.

The thus-obtained brazing sheet was cut into a piece of width 25 mm and length 70 mm, and was assembled with a bare material of a JIS alloy 3003 with t=1 mm. To the resultant assembly sample, as inverted T-joint test was conducted.

TABLE 1

| Filler alloy composition (mass %) | | | | |
|---|---|---|---|---|
| | Si | Cu | Zn | Al |
| 1 | 12 | 1.2 | 1.5 | Balance |
| 2 | 11 | 1.2 | 1.5 | Balance |
| 3 | 10 | 1.2 | 1.5 | Balance |
| 4 | 12 | 1.2 | — | Balance |
| 5 | 11 | — | 5 | Balance |
| 6 | 10 | — | — | Balance |
| 7 | 7 | 1.2 | 1.5 | Balance |
| 8 | 11 | 2.5 | 4 | Balance |

"—" means not added.

TABLE 2

| Core alloy composition (mass %) | | | | | |
|---|---|---|---|---|---|
| | Fe | Si | Cu | Mg | Al |
| 9 | 0.2 | 0.5 | 0.15 | 0.2 | Balance |
| 10 | 0.2 | 0.5 | 0.15 | 0.5 | Balance |
| 11 | 0.2 | 0.5 | 0.15 | 1.0 | Balance |
| 12 | 0.2 | 0.5 | 0.15 | 1.7 | Balance |
| 13 | 0.2 | 0.5 | 0.15 | 2.2 | Balance |
| 14 | 0.2 | 0.5 | 0.15 | — | Balance |

"—" means not added.

Hereinafter, the method of testing conducted will be described.

As shown in FIG. 1, which is a perspective view showing assembly of a test material for the brazing test, a brazing sheet 2 as a lower sheet and a JIS alloy 3003 material 1 as an upper sheet were assembled such that a surface of a filler material 2a of the brazing sheet and the JIS alloy 3003 material 1 would be brought into contact with each other. A core material 2b of the brazing sheet was provided under the filler material 2a of the brazing sheet.

To the resultant assembly, flux suspended in an amount of 5 mass % in tap water was applied, followed by drying sufficiently. The whole was subjected to heat brazing in an NB furnace at 600° C. for 3 minutes. Brazing property was evaluated through observation of a sectional texture of a fillet 3, which was a welded part. Table 3 shows the incipient fluidization temperature, solidus temperature, and liquidus temperature of the flux used in the test. The solidus temperature and liquidus temperature of the flux were adjusted by changing a mixing ratio of $KAlF_4$ to $K_2AlF_5.H_2O$ or a production method of the same. A mixing ratio of $KAlF_4:K_2AlF_5.H_2O$ in each of flux 15, 16, and 17 was 70:30, 90:10, and 95:5, in mass ratio, respectively.

TABLE 3

| Flux | | | |
|---|---|---|---|
| | Incipient fluidization temperature (° C.) | Solidus temperature (° C.) | Liquidus temperature (° C.) |
| 15 | 568 | 562 | 571 |
| 16 | 569 | 550 | 578 |
| 17 | 589 | 562 | 600 |

Table 4 shows the combination of assembled members, and the results of evaluation thereon. In the item of "brazing property", "o" designates a sample showing good results, and "x" designates a sample poor in brazing property.

The thus-brazed samples Nos. A to O (Examples) obtained through the method of the present invention of brazing an aluminum alloy material, each exhibited good brazing property.

In the sample No. Q (Comparative Example), a high melting point compound such as magnesium fluoride was formed before starting fluidization of the filler alloy, causing breakage in brazing (i.e. shortage of the filler alloy and failure in brazing), due to that the incipient fluidization temperature of the filler material was 590° C., which was higher by 22° C. than the incipient fluidization temperature of the flux of 568° C., and that a long time period of 88 seconds was required after fluidization of the flux till the start of fluidization of the filler material.

In sample No. R (Comparative Example), a high melting point compound such as magnesium fluoride was formed before starting fluidization of the filler alloy, causing breakage in brazing, due to that the incipient fluidization temperature of the filler material was as high as 595° C., which was higher by 27° C. than the incipient fluidization temperature of the flux of 568° C., and that a time period of 108 seconds was required after fluidization of the flux till the start of fluidization of the filler material.

In sample No. S (Comparative Example), a partial breakage in brazing was observed, due to that the incipient fluidization temperature of filler material was 558° C., which was lower than the incipient fluidization temperature of the flux, and that the filler material melted before the fluidization of the flux, to partly cover a welded part.

In sample No. T (Comparative Example to the invention according to the above item (2)), breakage in brazing was observed, due to that the magnesium content in the core alloy of the brazing sheet was as high as 2.2 mass %, and that magnesium fluoride was formed rapidly.

Sample No. U (Comparative Example to the invention according to the above item (5)), a partial breakage in brazing was observed, due to that a difference between the solid us temperature and the liquidus temperature of the flux was as large as 38° C. and the flux was poor in fluidity, and that the flux partly did not fluidize.

Sample No. P (Reference Example) exhibited good brazing property, since it contained no magnesium although it had a large difference in incipient fluidization temperature between the flux and the filler material of 22° C.

TABLE 4

Combination of assembled members and results of brazing property evaluation

| | Filler alloy | Core alloy | Flux | Brazing property | Incipient fluidization temperature of filler alloy (° C.) | Solidus temperature of filler alloy (° C.) | Liquidus temperature of filler alloy (° C.) | Incipient fluidization temperature of flux (° C.) | Difference of incipient fluidization temperature between filler alloy and flux (° C.) | Time period from fluidization of flux to fluidization of filler alloy (Sec.) |
|---|---|---|---|---|---|---|---|---|---|---|
| A | 1 | 9  | 15 | ○ | 570 | 558 | 575 | 568 | 2   | 8   |
| B | 1 | 10 | 15 | ○ | 570 | 558 | 575 | 568 | 2   | 8   |
| C | 1 | 11 | 15 | ○ | 570 | 558 | 575 | 568 | 2   | 8   |
| D | 1 | 12 | 15 | ○ | 570 | 558 | 575 | 568 | 2   | 8   |
| E | 2 | 9  | 15 | ○ | 574 | 559 | 580 | 568 | 6   | 24  |
| F | 2 | 10 | 15 | ○ | 574 | 559 | 580 | 568 | 6   | 24  |
| G | 2 | 11 | 15 | ○ | 574 | 559 | 580 | 568 | 6   | 24  |
| H | 2 | 12 | 15 | ○ | 574 | 559 | 580 | 568 | 6   | 24  |
| I | 3 | 9  | 15 | ○ | 579 | 559 | 587 | 568 | 11  | 44  |
| J | 3 | 10 | 15 | ○ | 579 | 559 | 587 | 568 | 11  | 44  |
| K | 3 | 11 | 15 | ○ | 579 | 559 | 587 | 568 | 11  | 44  |
| L | 3 | 12 | 15 | ○ | 579 | 559 | 587 | 568 | 11  | 44  |
| M | 4 | 10 | 15 | ○ | 572 | 562 | 576 | 568 | 4   | 16  |
| N | 5 | 10 | 15 | ○ | 574 | 567 | 577 | 568 | 6   | 24  |
| O | 1 | 10 | 16 | ○ | 570 | 558 | 575 | 569 | 1   | 4   |
| P | 6 | 14 | 15 | ○ | 590 | 577 | 596 | 568 | 22  | 88  |
| Q | 6 | 10 | 15 | x | 590 | 577 | 596 | 568 | 22  | 88  |
| R | 7 | 11 | 15 | x | 595 | 560 | 610 | 568 | 27  | 108 |
| S | 8 | 11 | 15 | x | 558 | 535 | 568 | 568 | −10 | —   |
| T | 2 | 13 | 15 | x | 574 | 559 | 580 | 568 | 6   | 24  |
| U | 6 | 10 | 17 | x | 590 | 577 | 596 | 589 | 1   | 4   |

INDUSTRIAL APPLICABILITY

The method of the present invention of welding an aluminum alloy material is preferable for a NOCOLOCK brazing method (a brazing method for an aluminum alloy using potassium fluoroaluminate flux).

Further, by utilizing the above brazing method, the method of the present invention of producing an aluminum alloy heat exchanger is preferable for a method of producing a heat exchanger by a NOCOLOCK brazing method using an aluminum alloy material containing magnesium.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A method of brazing an aluminum alloy material, comprising:
selecting an aluminum alloy filler material and a flux comprising $KAlF_4$ and $K_2AlF_5 \cdot H_2O$ satisfying the following condition:

$$Ts \leq Tf \leq Ts+6° C.,$$

wherein Tf represents an incipient fluidization temperature of the filler material, and
Ts represents an incipient fluidization temperature of the flux; providing a brazing sheet comprising
an aluminum alloy core material, and
the aluminum alloy filler material;
providing the flux comprising $KAlF_4$ and $K_2AlF_5 \cdot H_2O$; and
brazing the aluminum alloy material by heating the filler material and the flux
wherein the aluminum alloy core material contains 0.05 mass % or more and 2 mass % or less of magnesium.

2. The method of brazing an aluminum alloy material according to claim 1, wherein the filler material starts to fluidize within 60 seconds after starting fluidization of the flux.

3. The method of brazing an aluminum alloy material according to claim 1, wherein the filler material has a difference between solidus temperature and liquidus temperature of 30° C. or less.

4. The method of brazing according to claim 1, wherein the method is incorporated in a method of producing an aluminum alloy heat exchanger.

5. A method of brazing an aluminum alloy material, comprising:
selecting an aluminum alloy filler material and a flux comprising $KAlF_4$ and $K_2AlF_5 \cdot H_2O$ satisfying the following condition:

$$Ts \leq Tf \leq Ts+10° C.,$$

wherein Tf represents an incipient fluidization temperature of the filler material, and
Ts represents an incipient fluidization temperature of the flux;
providing a brazing sheet comprising
an aluminum alloy core material, and
the aluminum alloy filler material;
providing the flux comprising $KAlF_4$ and $K_2AlF_5 \cdot H_2O$; and
brazing the aluminum alloy material by heating the filler material and the flux, wherein the aluminum alloy core material contains 0.05 mass % or more and 2 mass % or less of magnesium, and
wherein the filler material starts to fluidize within 40 seconds after the flux starts to fluidize.

6. The method of brazing an aluminum alloy material according to claim 1, wherein ratio of $(KAlF_4):(K_2AlF_5.H_2O)$ is in a range of 70:30 to 90:10.

7. The method of brazing an aluminum alloy material according to claim 1, wherein the flux has a difference between solidus temperature and liquidus temperature of 30° C. or less.

8. A method of brazing an aluminum alloy material, comprising:
    selecting an aluminum alloy filler material and a flux comprising $KAlF_4$ and $K_2AlF_5.H_2O$ satisfying the following condition:
    $$Ts \leq Tf \leq Ts+10° C.,$$
    wherein Tf represents an incipient fluidization temperature of the filler material, and
    Ts represents an incipient fluidization temperature of the flux;
    providing a brazing sheet comprising
        an aluminum alloy core material, and
        the aluminum alloy filler material;
    providing the flux comprising $KAlF_4$ and $K_2AlF_5.H_2O$; and
    brazing the aluminum alloy material by heating the filler material and the flux,
    wherein the aluminum alloy core material contains 0.05 mass % or more and 2 mass % or less of magnesium.

* * * * *